United States Patent
Mesner et al.

(10) Patent No.: US 11,719,007 B2
(45) Date of Patent: Aug. 8, 2023

(54) TURNBUCKLE-STYLE SUPPORT STRUT WITH TUNABLE STIFFNESS

(71) Applicant: The Boeing Company, Chicago, IL (US)

(72) Inventors: Grantland G. Mesner, Madison, AL (US); William S. Monk, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 256 days.

(21) Appl. No.: 16/372,680

(22) Filed: Apr. 2, 2019

(65) Prior Publication Data

US 2020/0318368 A1  Oct. 8, 2020

(51) Int. Cl.
| | | |
|---|---|---|
| F16F 1/32 | (2006.01) | |
| E04G 21/26 | (2006.01) | |
| F16F 1/18 | (2006.01) | |
| E04G 17/04 | (2006.01) | |
| F16F 1/38 | (2006.01) | |

(52) U.S. Cl.
CPC .............. *E04G 17/042* (2013.01); *F16F 1/32* (2013.01); *E04G 21/26* (2013.01); *F16F 1/18* (2013.01); *F16F 1/185* (2013.01); *F16F 1/38* (2013.01)

(58) Field of Classification Search
CPC ...... F16F 1/32; F16F 1/123; F16F 1/18; F16F 1/185; F16F 1/38; F16F 7/087; F16F 7/09; E04G 17/042; E04G 25/005; E04G 21/26
USPC ........................ 52/167.1, 167.3, 167.4, 293.3
See application file for complete search history.

(56) References Cited

U.S. PATENT DOCUMENTS

| | | | | | |
|---|---|---|---|---|---|
| 2,420,364 | A | * | 5/1947 | Espenas | F16G 11/12 403/48 |
| 2,708,110 | A | * | 5/1955 | Clay | F16F 1/32 267/162 |
| 2,731,758 | A | * | 1/1956 | Coe | A01K 91/06 43/42.72 |
| 2,813,733 | A | * | 11/1957 | Herrmann | F16G 11/12 403/44 |
| 3,059,727 | A | * | 10/1962 | Fuchs | F16F 7/02 188/381 |
| 3,462,137 | A | * | 8/1969 | Grube | B60P 7/0823 410/41 |
| 3,537,696 | A | * | 11/1970 | Webster, Jr. | B60G 17/02 267/293 |
| 3,610,606 | A | * | 10/1971 | Andrews | F16F 15/02 267/74 |
| 3,713,516 | A | * | 1/1973 | Freyler | F16F 7/09 188/129 |
| 3,873,079 | A | * | 3/1975 | Kuus | F16F 1/32 267/162 |
| 4,036,319 | A | * | 7/1977 | Andre | F16F 1/32 188/282.6 |

(Continued)

FOREIGN PATENT DOCUMENTS

| | | | | |
|---|---|---|---|---|
| DE | 4241552 A1 | * | 6/1994 | ............... F16F 1/32 |
| DE | 10205788 A1 | * | 8/2003 | ............... F16F 1/32 |
| GB | 587183 A | * | 4/1947 | ............... F16F 7/09 |

*Primary Examiner* — Phi D A
(74) *Attorney, Agent, or Firm* — Gates & Cooper LLP

(57) ABSTRACT

A turnbuckle-style support strut with tunable stiffness, wherein the turnbuckle-style support strut uses opposing stacks comprised of one or more Belleville spring washers to provide the tunable stiffness to support a given application.

20 Claims, 9 Drawing Sheets

(56) References Cited

U.S. PATENT DOCUMENTS

| | | | | |
|---|---|---|---|---|
| 4,200,268 A * | 4/1980 | Wiek | B60G 11/22 | 267/152 |
| 4,238,104 A * | 12/1980 | Hamilton | F16F 3/10 | 188/380 |
| 4,456,233 A * | 6/1984 | Muller | F16F 1/32 | 24/68 CT |
| 4,627,375 A * | 12/1986 | Davis | B63B 21/00 | 114/219 |
| 4,681,303 A * | 7/1987 | Grassano | A01K 27/005 | 119/769 |
| 4,955,467 A * | 9/1990 | Kallenbach | F16F 7/09 | 188/134 |
| 4,968,010 A * | 11/1990 | Odobasic | B60G 11/48 | 267/140.11 |
| 5,211,379 A * | 5/1993 | Porter | B60N 2/231 | 267/221 |
| 5,257,680 A * | 11/1993 | Corcoran | F16F 7/02 | 188/129 |
| 5,339,930 A * | 8/1994 | Sich | B60T 11/04 | 188/210 |
| 5,390,903 A * | 2/1995 | Fidziukiewicz | F16F 1/32 | 267/162 |
| 5,549,182 A * | 8/1996 | Ehrnsberger | D06F 37/20 | 188/129 |
| 5,613,580 A * | 3/1997 | Young | F16F 7/09 | 188/300 |
| 6,471,198 B2 * | 10/2002 | Herbst | F16F 1/40 | 188/381 |
| 6,612,264 B2 * | 9/2003 | Levine | A01K 27/005 | 119/719 |
| 7,350,628 B2 * | 4/2008 | Adoline | F16F 3/04 | 188/67 |
| D571,059 S * | 6/2008 | Napolitano | D30/153 | |
| 8,186,924 B1 * | 5/2012 | Espinosa | E04B 1/2604 | 411/536 |
| 9,822,838 B2 * | 11/2017 | McCoy | F16F 7/09 | |
| 9,963,878 B2 * | 5/2018 | Douglas | E04C 3/00 | |
| 2005/0022619 A1 * | 2/2005 | Clingman | B64C 3/52 | 74/82 |
| 2006/0027955 A1 * | 2/2006 | Adoline | F16F 1/128 | 267/64.12 |
| 2018/0180129 A1 * | 6/2018 | Huck | B61D 7/18 | |
| 2018/0319312 A1 * | 11/2018 | Cooper | G01L 5/101 | |

* cited by examiner

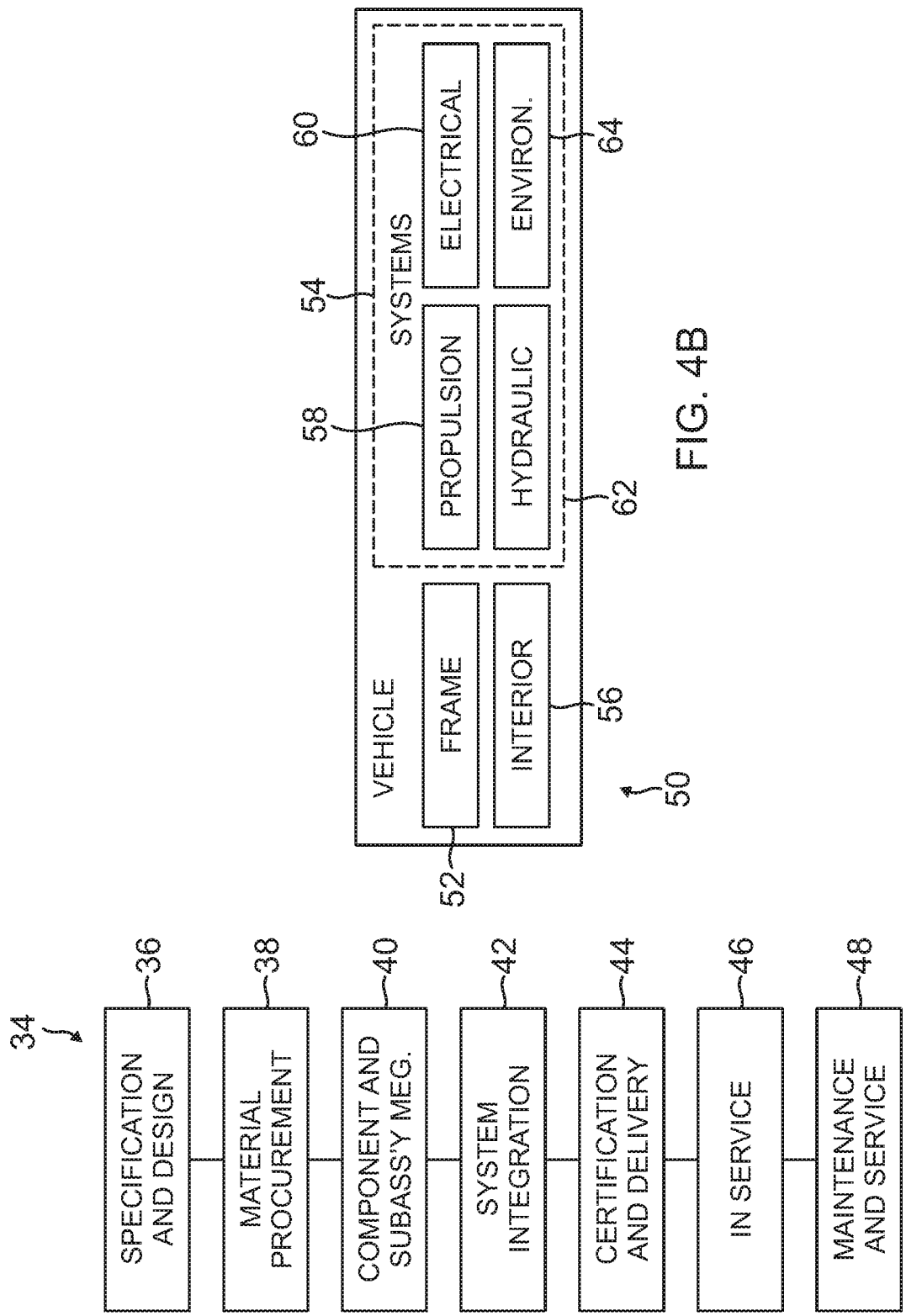

TURNBUCKLE-STYLE SUPPORT STRUT WITH TUNABLE STIFFNESS

STATEMENT REGARDING FEDERALLY SPONSORED RESEARCH AND DEVELOPMENT

This invention was made with Government support under Contract Number NNM07AB03C awarded by NASA. The government has certain rights in this invention.

BACKGROUND INFORMATION

1. Field

The disclosure is related generally to a turnbuckle-style support strut with tunable stiffness.

2. Background

There is a need for struts or springs that limit load transfer caused by enforced displacements from one structural member to another. For example, a strut may be required in a design where loads for a structure exceed requirements, because the structure is too stiff.

There are a number of existing solutions available, such as coil spring struts, machined spring struts and leaf springs. However, it is difficult to achieve a desired stiffness and travel with a coiled spring strut; it is difficult to achieve the desired stiffness and travel with a machined spring strut while maintaining a positive margin of safety on stress; and leaf springs on mating brackets require that a support strut become shorter to the point where a desired connection may not be feasible.

What is needed, then, is an improved support strut.

SUMMARY

To overcome the limitations described above, and to overcome other limitations that will become apparent upon reading and understanding the present specification, the present disclosure describes a turnbuckle-style support strut with tunable stiffness, wherein the turnbuckle-style support strut uses opposing stacks comprised of one or more Belleville spring washers to provide an axial travel range and stiffness to support a given application.

DRAWINGS

Referring now to the drawings in which like reference numbers represent corresponding parts throughout:

FIG. 4A illustrates a manufacturing and service method, and FIG. 4B illustrates an aerospace vehicle or other structure, in which the invention may be used.

DETAILED DESCRIPTION

Figure 1A:
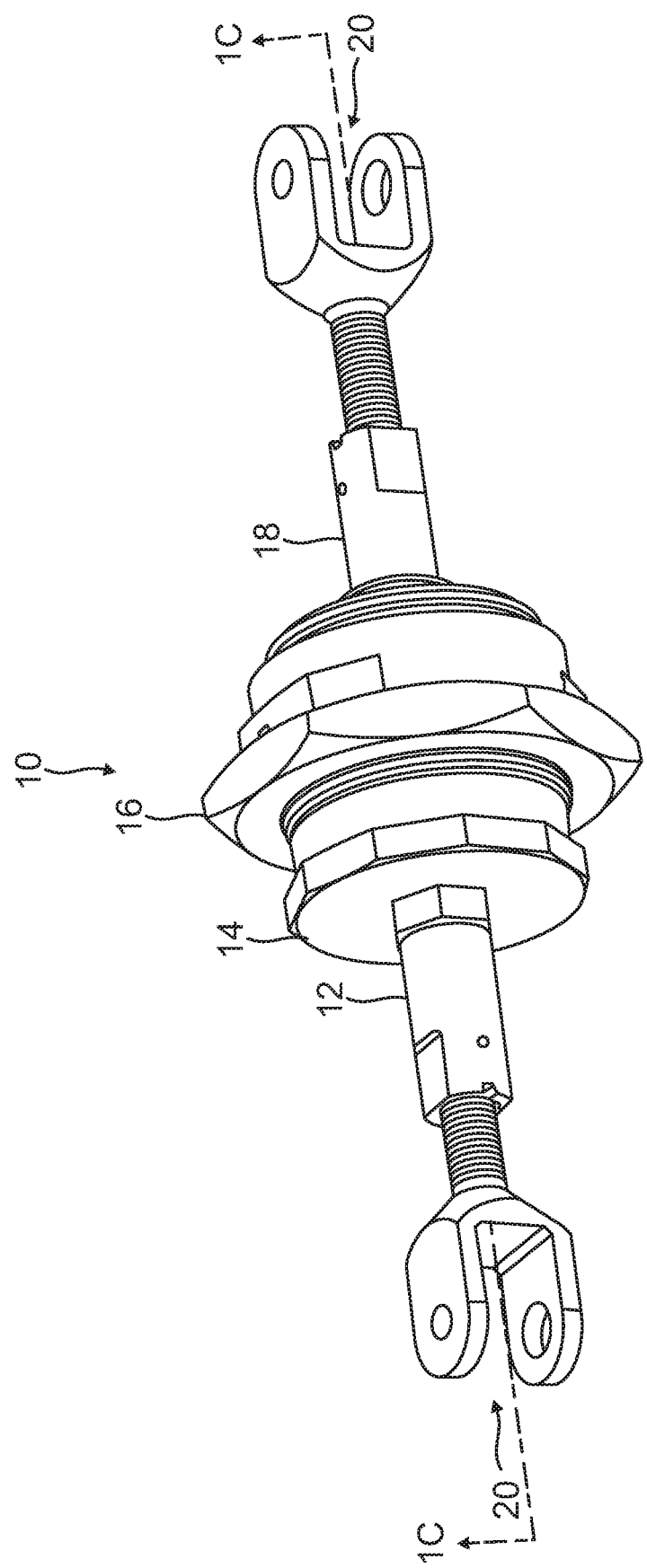
FIGS. 1A, 1B and 1C are a perspective view, an exploded assembly view and of a cross-sectional side view, respectively, of a turnbuckle-style support strut with tunable stiffness, according to one embodiment.

In the following description, reference is made to the accompanying drawings which form a part hereof, and in which is shown by way of illustration a specific example in which the disclosure may be practiced. It is to be understood that other examples may be utilized and structural changes may be made without departing from the scope of the present disclosure.

Overview

The present invention discloses a turnbuckle-style support strut with tunable stiffness, wherein the turnbuckle-style support strut uses opposing stacks comprised of one or more Belleville spring washers to provide a required axial travel range and stiffness to support a given application. The turnbuckle-style support strut is typically used for coupling one or more structures.

A strut is a structural member of a structural framework of some kind, which carries loads in either tension or compression to help keep the structure as a whole in proper alignment. Struts generally work by resisting longitudinal tension or compression.

A turnbuckle is a device for adjusting the tension, compression, axial loading or length when coupling two structures. A turnbuckle normally is comprised of two threaded structural elements, one screwed into each end of a body, wherein one of the structural elements has a left-hand thread and the other of the structural elements has a right-hand thread. The tension can be adjusted by rotating the body, which causes both structural elements to be screwed in or out simultaneously, without twisting the structural elements, which changes the axial length.

A Belleville spring washer is a coned-disc spring that can be loaded along its axis either statically or dynamically. Belleville spring washers can be used as a single spring or as a stack. In a stack, Belleville spring washers can have the same or an alternating direction to modify the spring constant, the spring rate or the amount of deflection. Stacking in the same direction adds the spring constant in parallel, creating a stiffer structure with the same deflection. Stacking in an alternating direction is similar to adding common springs in series, resulting in a lower spring constant and greater deflection. Mixing and matching directions allow a specific spring constant and deflection capacity to be designed. In addition, different thicknesses of Belleville spring washers can tune the spring rate. However, weight and limited travel length can be issues.

In the present invention, the Belleville spring washers are preloaded to support an axial travel range, while ensuring the washers remain under load to prevent chatter. The support strut contains threaded interfaces at each end (one end has right-hand thread, the opposing end has left-hand thread) to allow for turnbuckle-style motion, in which the end fittings can be drawn in or extended out to facilitate installation, assembly and part variance.

The support strut can be attached to another structure by any number of methods. Typically, support struts are attached using clevis or pin connections with spherical bearings.

The support strut of the present invention limits load transfer caused by enforced displacements and structural shock events from one structural member to another via the spring system of the Belleville spring washers. It does this while maintaining the turnbuckle-style behavior without the need for external springs, such as coil springs, machined springs or leaf springs. The short stroke length and compact nature of Belleville spring washers allows the unit to be much shorter than a conventional spring system.

TECHNICAL DESCRIPTION

Figure 1B:
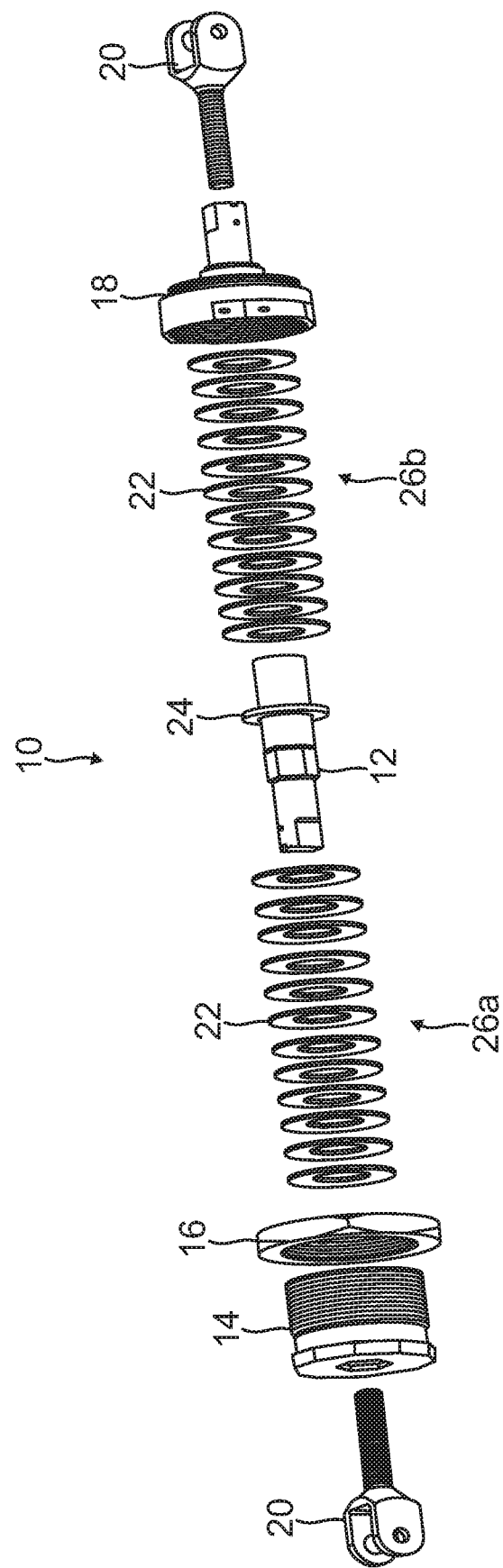
Figure 1C:
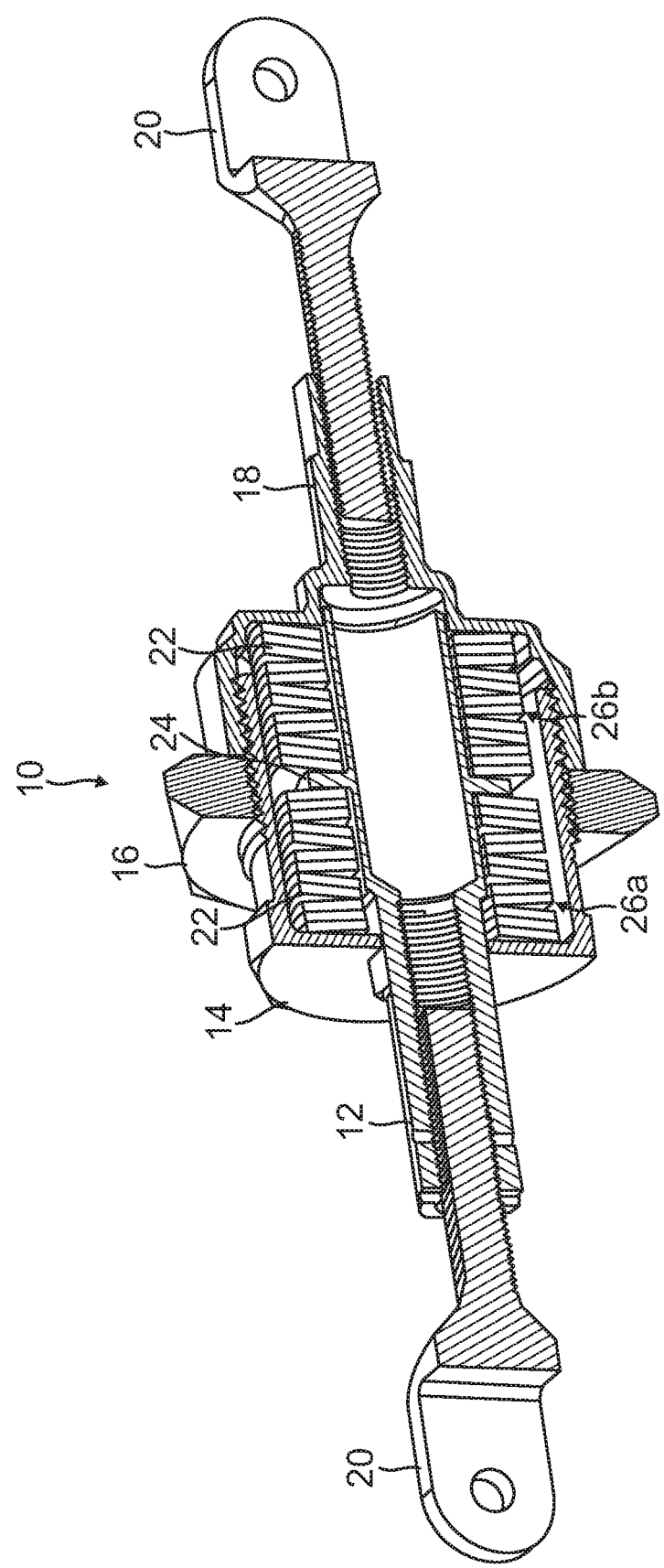

FIG. 1A is perspective view of a turnbuckle-style support strut 10 with tunable stiffness, FIG. 1B is an exploded assembly view of the turnbuckle-style support strut 10, and FIG. 1C is a cross-sectional side view of the turnbuckle-style support strut 10, according to one embodiment. The support strut 10 includes a threaded plunger 12, rotation locking cap 14, jam nut 16, and threaded housing 18, wherein the threaded plunger 12 and threaded housing 18 are coupled to end fittings 20.

The threaded plunger 12 and the threaded housing 18 have opposite internal threads along an axis of the support strut 10, i.e., one has a right-hand thread and the other has a left-hand thread. Alternatively, the threaded plunger 12 and the threaded housing 18 could have opposite external threads.

Together, the threaded plunger 12 and the threaded housing 18 allow for turnbuckle-style connections to the end fittings 20. The end fittings 20 have the appropriate right-hand or left-hand threading to match the threading on the plunger 12 and housing 18.

This view also shows the Belleville spring washers 22 assembled within the rotation locking cap 14 and threaded housing 18 along a longitudinal axis of the threaded plunger 12. A flange 24 extending radially from the threaded plunger 12 separates two stacks 26a, 26b of the Belleville spring washers 22, such that the stacks of the Belleville spring washers 22 are on each side of the flange 24.

Other embodiments may include a greater or lesser number of the Belleville spring washers 22 in each stack 26a, 26b, as well as in total. Moreover, other embodiments may have more or less than half of the Belleville spring washers 22 in the stacks 26a, 26b on each side of the flange 24, including embodiments with different numbers of the Belleville spring washers 22 in the stacks 26a, 26b on each side of the flange 24. Further, other embodiments may have different orientations of the Belleville spring washers 22 in the stacks 26a, 26b than those shown herein.

Figure 2C:
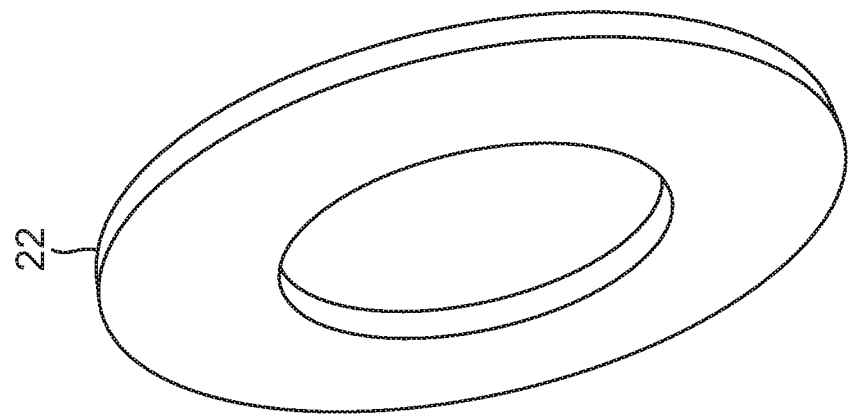
FIGS. 2A, 2B and 2C show three different views of Belleville spring washers singularly in first, second and third orientations, respectively.
Figure 2B:
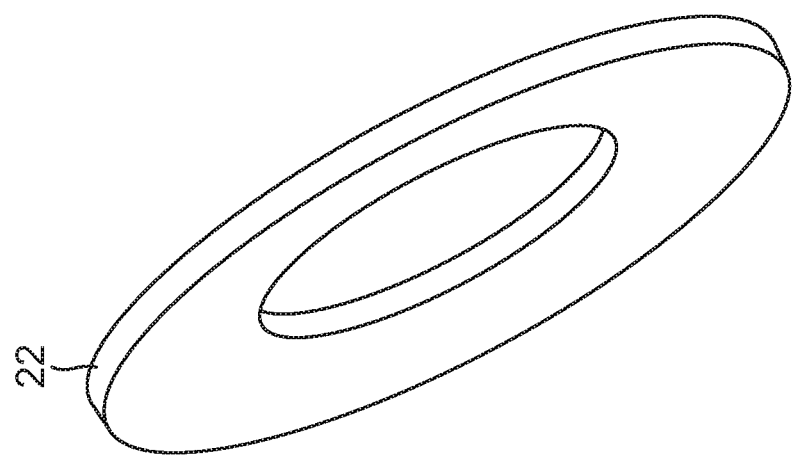
Figure 2A:
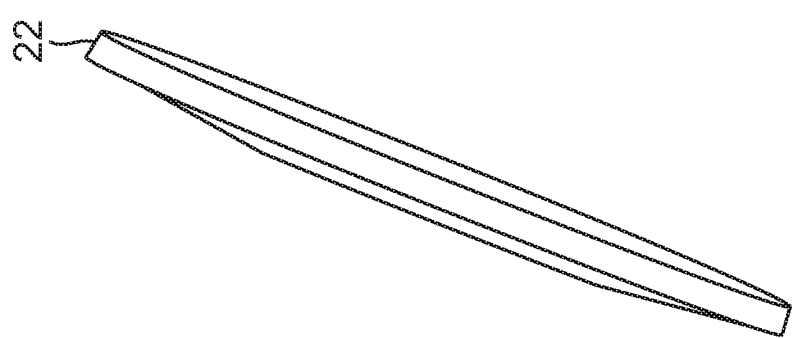

FIGS. 2A, 2B and 2C show three different views of Belleville spring washers 22 singularly in first, second and third orientations, respectively.

FIGS. 3A, 3B, 3C and 3D are cross-sectional side views of the turnbuckle-style support strut 10, according to one embodiment, including the threaded plunger 12, rotation locking cap 14, jam nut 16, threaded housing 18, Belleville spring washers 22, and flange 24, but without the end fittings 20.

Figure 3A:
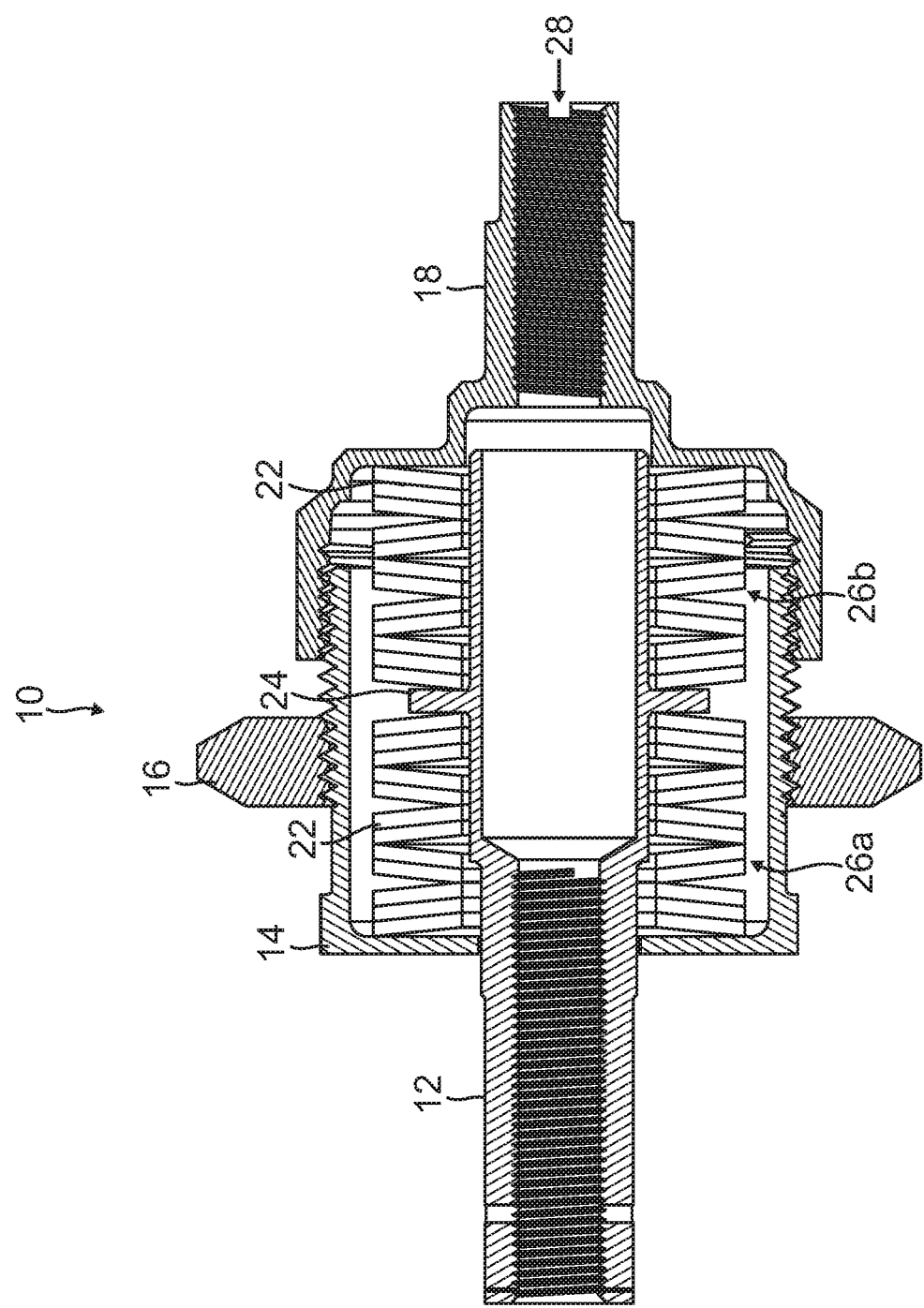
FIGS. 3A, 3B, 3C and 3D are cross-sectional side views of the turnbuckle-style support strut, according to one embodiment.

FIG. 3A shows the turnbuckle-style support strut 10 in a pre-installed position where the threaded housing 18 has not been screwed down on the rotation locking cap 14 and seated against the jam nut 16. In this configuration, the stacks 26a, 26b of Belleville spring washers 22 on either side of the flange 24 are not subject to tension or compression along an x-axis 28 of the support strut 10. In this example, the stacks 26a, 26b on either side of the flange 24 are symmetric; however, the stacks 26a, 26b on either side of the flange 24 may be asymmetric as well.

Figure 3B:
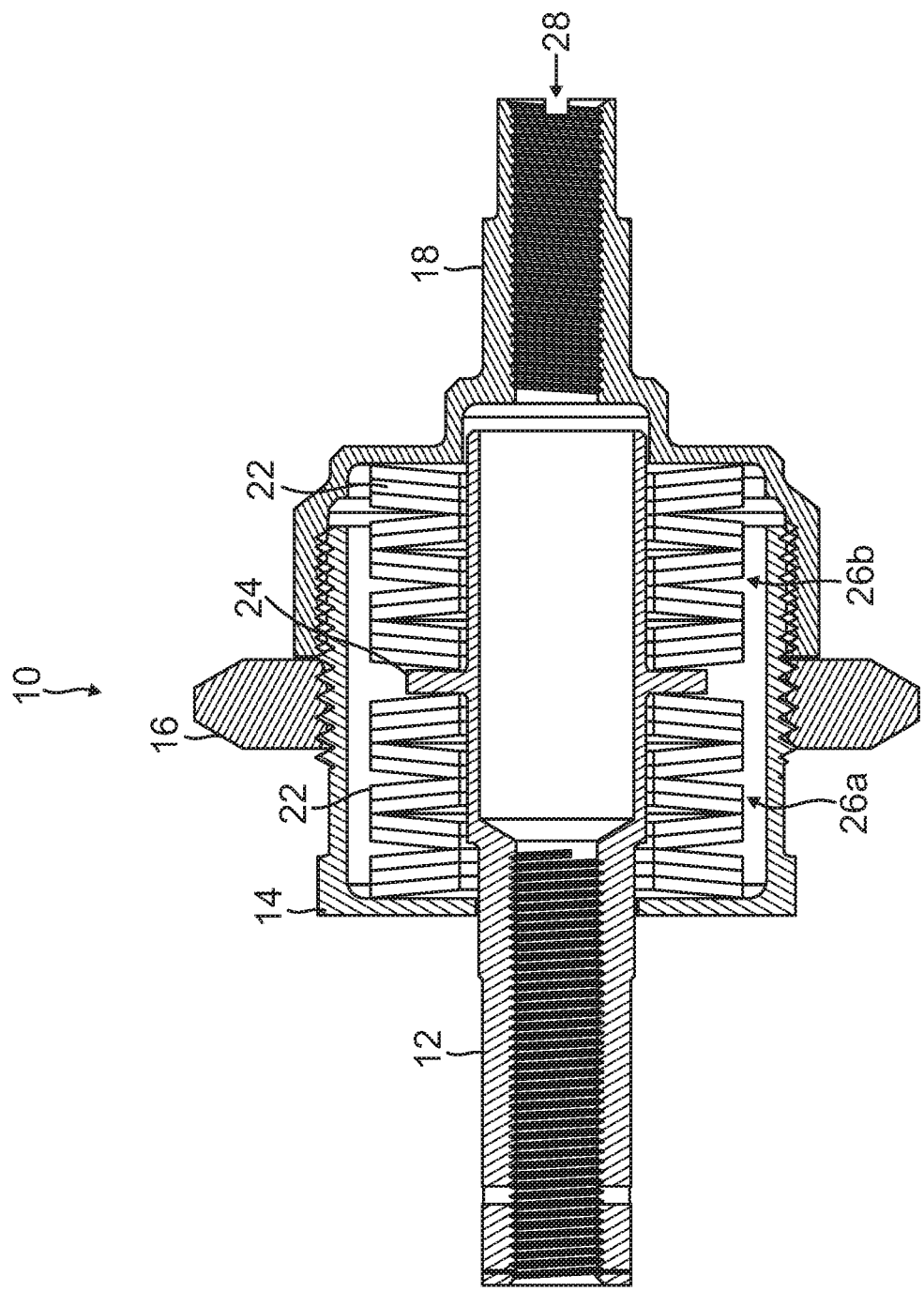

FIG. 3B shows the turnbuckle-style support strut 10 in an installed position where the threaded housing 18 has been screwed down on the rotation locking cap 14 and seated against the jam nut 16. In this configuration, the Belleville spring washers 22 are preloaded to support an axial travel range, while ensuring the Belleville spring washers 22 remain under constant load to prevent chatter. The Belleville spring washers 22 are preloaded by torqueing the threaded housing 18 onto the rotation locking cap 14 to compress the washers 22 to about 50% of their compression limit. The jam nut 16 prevents the housing 18 from backing off the rotation locking cap 14, which would decompress the washers 22.

Figure 3C:
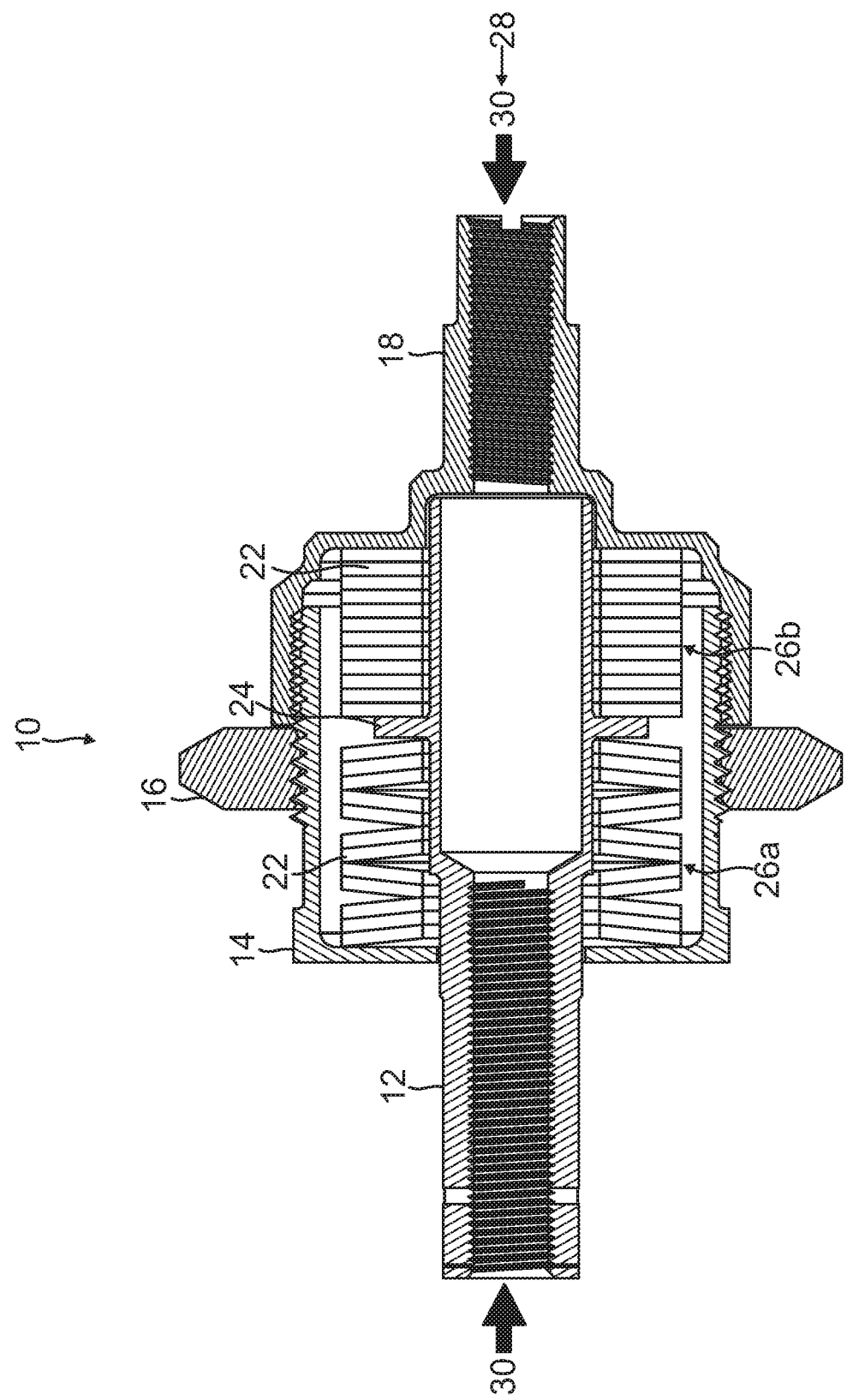
Figure 3D:
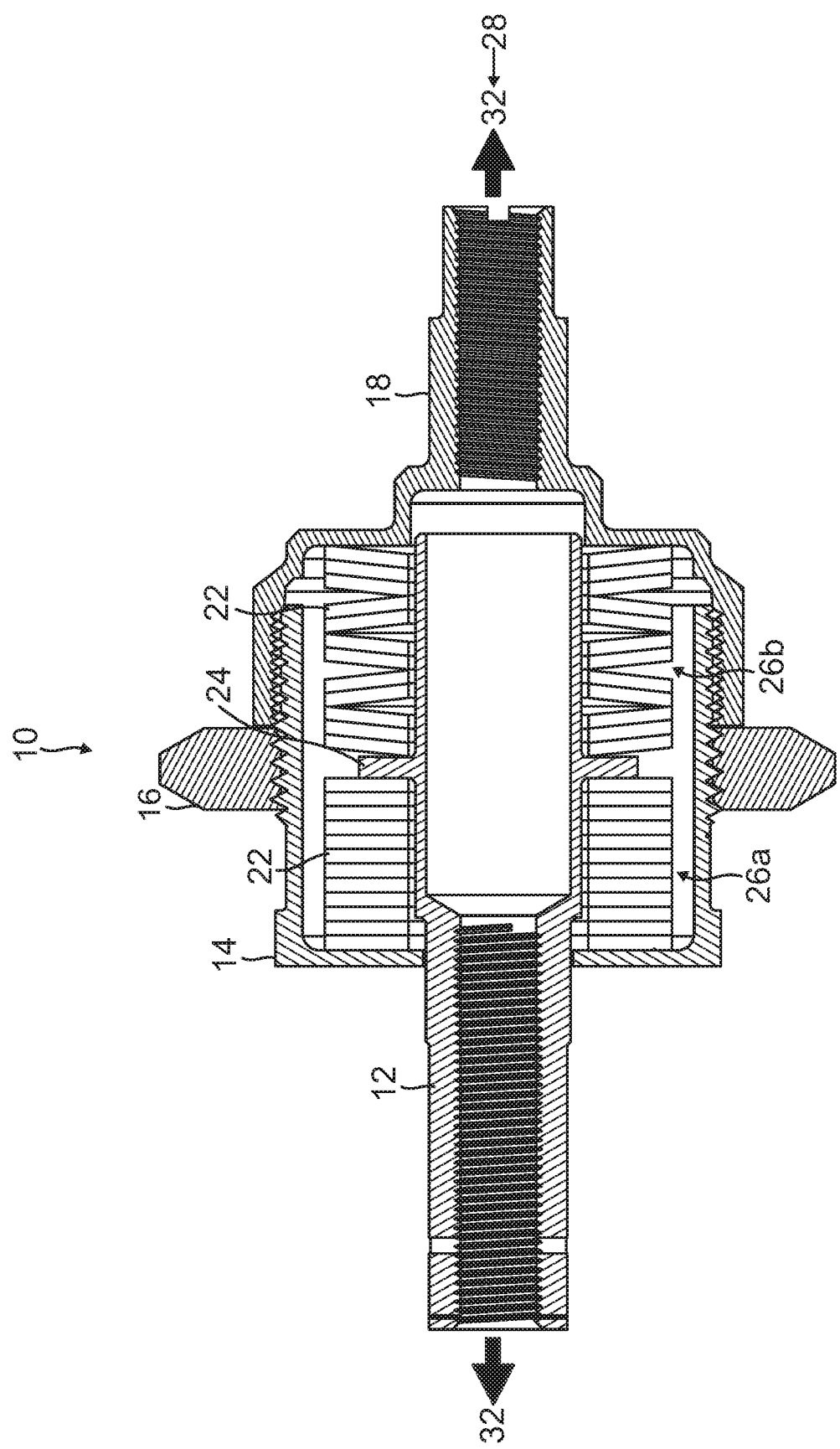

FIGS. 3C and 3D show the turnbuckle-style support strut 10 under service tension absorption and under service compression absorption, respectively, as indicated by the force vectors 30 and 32 along the x-axis 28 of the strut 10.

The stacks 26a, 26b of Belleville spring washers 22 determine the stiffness of the support strut 10. In one embodiment, a spring resistance force along the x-axis 28 is provided by the movement of the flange 24 and the resulting compression or de-compression of the stacks 26a, 26b of the Belleville spring washers 22 by the flange 24. The compression of the washers 22 on either side of the flange 24 provides loading to the flange 24 and therefore the plunger 12 is moved relative to the housing 18.

The threaded plunger 12 has a hexagonal interface with the rotation locking cap 14 to react to any torsional load, so that the ends of the support strut 10, namely, the threaded plunger 12 and the threaded housing 18, cannot rotate relative to the other. Torsional loading will depend on how the support strut 10 is connected to another structure. Spherical bearings are typically used in the end fittings 20 to eliminate any torsional loading. If an application of the support strut 10 results in torsional loading, the load would be reacted through the hexagonal interface of the threaded plunger 12 with the rotation locking cap 14, and through the rest of the support strut 10.

In the tension case of FIG. 3C, the arrows 30 illustrate a load on the x-axis 28 of the strut 10. The stack 26a of Belleville spring washers 22 on the left-side of the flange 24 compresses, while the stack 26b of Belleville spring washers 22 on the right-side of the flange 24 de-compresses. The Belleville spring washers 22 are always under a compression load. On the left-side stack 26a, this creates an axial load on the cap 14 and the flange 24 of the plunger 12. On the right-side stack 26b, an equivalent axial force is created on the threaded housing 18 and the opposite side of the flange 24 on the plunger 12.

In the compression case of FIG. 3D, the arrows 32 illustrate a load on the x-axis 28 of the strut 10. The stack 26a of Belleville spring washers 22 on the left-side of the flange 24 de-compresses, while the stack 26b of Belleville spring washers 22 on the right-side of the flange 24 compresses. As the force 32 is applied, the compressive forces described above increases as a result of the spring constant of the Belleville spring washers 22.

The Belleville spring washers 22 are tunable, based on a stiffness target, depending on a stiffness and configuration of the Belleville spring washers 22. Both spring stiffness and travel are tailorable, based on a length of the support strut 10 and its components, the number and configuration of the Belleville spring washers 22, and the dimensions and material composition of the Belleville spring washers 22. The support strut 10 and its components can be lengthened or shortened to accommodate more or fewer Belleville spring washers 22. In addition, the diameter of the support strut 10 and its components can be increased or decreased to accommodate larger or smaller diameter Belleville spring washers 22. The spring constant for the washers 22 depends on the washer 22 stiffness, which changes based upon the composition of the washer, the dimensions of the washer 22, the shape of the washer 22, and the configuration of washers 22, including their numbers and orientations, in both serial and parallel stacks 26a, 26b.

BENEFITS AND ADVANTAGES

The support strut of the present invention provides a number of benefits and advantages. As noted above, spring stiffness and travel are both tailorable. The Belleville spring washers 22 can be arranged to provide an almost unlimited number of combinations of stiffness and travel. In another example, the spring element combined with turnbuckle-type end interfaces allows for simple installation. In yet another example, the support strut 10 provides a compact design with a failure tolerance, such that if one Belleville spring washer 22 were to fail in a manner that significantly alters the stiffness of the washer 22, such as crack or fracture, the strut 10 would maintain a significant percentage of its original stiffness.

Aerospace Applications

Embodiments of the disclosure may be described in the context of aerospace applications, including manufacturing and service methods, as shown in FIG. 4A and a vehicle or other structure, as shown in FIG. 4B. Specifically, these figures describe fabricating a turnbuckle-style support strut with tunable stiffness for use, for example, in aerospace applications, wherein the turnbuckle-style support strut uses opposing stacks comprised of one or more Belleville spring washers to provide the required axial travel and stiffness to support the aerospace applications.

As shown in FIG. 4A, during pre-production, exemplary method 34 may include specification and design 36 of the vehicle or structure, and material procurement 38. During production, component and subassembly manufacturing 40 and system integration 42 takes place. Thereafter, there may be certification and delivery 44 in order for the vehicle or structure to be placed in service 46. While in service 46, the vehicle or structure may be scheduled for routine maintenance and service 48 (which includes modification, reconfiguration, refurbishment, and so on).

Each of the processes of method 34 may be performed or carried out by a system integrator, a third party, and/or an operator (e.g., a customer). For the purposes of this description, a system integrator may include without limitation any number of manufacturers and major-system subcontractors; a third party may include without limitation any number of vendors, subcontractors, and suppliers; and an operator may be any type of company, entity, organization, and so on.

As shown in FIG. 4B, the vehicle or other structure 50 produced by exemplary method of FIG. 4A may include a frame 52 with a plurality of systems 54 and an interior 56. Examples of high-level systems 54 include one or more of a propulsion system 58, an electrical system 60, a hydraulic system 62, and an environmental system 64. Any number of other systems may be included. Although an aerospace example is shown, the principles of the invention may be applied to other examples.

Apparatus and methods embodied herein may be employed during any one or more of the stages of the production and service method 34. For example, components or subassemblies corresponding to production processes 40 and 42 may be fabricated or manufactured in a manner similar to components or subassemblies produced while the vehicle or structure 50 is in service. Also, one or more apparatus embodiments, method embodiments, or a combination thereof may be utilized during the production stages 40 and 42, for example, by substantially expediting assembly of or reducing the cost of the vehicle or structure 50. Similarly, one or more of apparatus embodiments, method embodiments, or a combination thereof may be utilized while the vehicle or structure 50 is in service, for example and without limitation, to maintenance and service 48.

What is claimed is:

1. An apparatus, comprising:
   a turnbuckle-style support strut;
   wherein:
   the turnbuckle-style support strut includes a threaded housing, threaded plunger, rotation locking cap, jam nut and end fittings;
   the threaded housing and the threaded plunger have opposite threads along an axis of the turnbuckle-style support strut to allow for a turnbuckle-style connection in which the threaded housing and the threaded plunger are coupled to the end fittings;
   the end fittings have the opposite threads to match the threaded housing and the threaded plunger, such that the end fittings are drawn in or extended out by rotation of the threaded housing and the threaded plunger;
   the threaded housing is screwed down on the rotation locking cap and seated against the jam nut, and the threaded plunger has an interface with the rotation locking cap, such that the threaded housing and threaded plunger cannot rotate relative to each other;
   the turnbuckle-style support strut uses opposing stacks comprised of one or more Belleville spring washers that are coned-disc springs;
   the Belleville spring washers are assembled within the rotation locking cap and the threaded housing, and mounted along an axis of the threaded plunger within the threaded housing;
   the opposing stacks of the Belleville spring washers are separated by a flange on the threaded plunger extending radially from the threaded plunger, with the opposing stacks of the Belleville spring washers on opposite sides of the flange;
   a spring resistance force is provided by movement of the flange resulting in compression or de-compression of the opposing stacks of the Belleville spring washers on opposite sides of the flange within the threaded housing; and
   the opposing stacks of the Belleville spring washers separated by the flange on the threaded plunger determine a tunable stiffness of the turnbuckle-style support strut based on a configuration of the opposing stacks of the Belleville spring washers.

2. The apparatus of claim 1, wherein the Belleville spring washers are preloaded to support an axial travel range while ensuring that the Belleville spring washers remain under load to prevent chatter.

3. The apparatus of claim 2, wherein the axial travel range is tailorable, based on a length of the turnbuckle-style support strut and a configuration of the Belleville spring washers.

4. The apparatus of claim 1, wherein the configuration of the opposing stacks of the Belleville spring washers comprises a number of the Belleville spring washers in the opposing stacks of the Belleville spring washers, dimensions of the Belleville spring washers, and/or material composition of the Belleville spring washers.

5. Fabricating a portion of an aircraft using the apparatus of claim 1.

6. The apparatus of claim 2, wherein the Belleville spring washers are preloaded by torqueing the threaded housing onto the rotation locking cap to compress the Belleville spring washers.

7. The apparatus of claim 6, wherein the jam nut prevents the threaded housing from backing off the rotation locking cap to decompress the Belleville spring washers.

8. A method, comprising:
   coupling a turnbuckle-style support strut to one or more structures;

wherein:
the turnbuckle-style support strut includes a threaded housing, threaded plunger, rotation locking cap, jam nut and end fittings;
the threaded housing and the threaded plunger have opposite threads along an axis of the turnbuckle-style support strut to allow for a turnbuckle-style connection in which the threaded housing and the threaded plunger are coupled to the end fittings;
the end fittings have the opposite threads to match the threaded housing and the threaded plunger, such that the end fittings are drawn in or extended out by rotation of the threaded housing and the threaded plunger;
the threaded housing is screwed down on the rotation locking cap and seated against the jam nut, and the threaded plunger has an interface with the rotation locking cap, such that the threaded housing and threaded plunger cannot rotate relative to each other;
the turnbuckle-style support strut uses opposing stacks comprised of one or more Belleville spring washers that are coned-disc springs;
the Belleville spring washers are assembled within the rotation locking cap and the threaded housing, and mounted along an axis of the threaded plunger within the threaded housing;
the opposing stacks of the Belleville spring washers are separated by a flange on the threaded plunger extending radially from the threaded plunger, with the opposing stacks of the Belleville spring washers on opposite sides of the flange within the threaded housing;
a spring resistance force is provided by movement of the flange resulting in compression or de-compression of the opposing stacks of the Belleville spring washers on opposite sides of the flange; and
the opposing stacks of the Belleville spring washers separated by the flange on the threaded plunger determine a tunable stiffness of the turnbuckle-style support strut based on a configuration of the opposing stacks of the Belleville spring washers.

9. The method of claim 8, wherein the Belleville spring washers are preloaded to support an axial travel range while ensuring that the Belleville spring washers remain under load to prevent chatter.

10. The method of claim 8, wherein the axial travel range is tailorable, based on a length of the turnbuckle-style support strut and a configuration of the Belleville spring washers.

11. The method of claim 8, wherein the configuration of the opposing stacks of the Belleville spring washers comprises a number of the Belleville spring washers in the opposing stacks of the Belleville spring washers, dimensions of the Belleville spring washers, and/or material composition of the Belleville spring washers.

12. A portion of an aircraft assembled according to the method of claim 8.

13. The method of claim 9, wherein the Belleville spring washers are preloaded by torqueing the threaded housing onto the rotation locking cap to compress the Belleville spring washers.

14. The method of claim 13, wherein the jam nut prevents the threaded housing from backing off the rotation locking cap to decompress the Belleville spring washers.

15. A method, comprising:
fabricating a turnbuckle-style support strut;
wherein:
the turnbuckle-style support strut includes a threaded housing, a threaded plunger, rotation locking cap, jam nut and end fittings;
the threaded housing and the threaded plunger have opposite threads along an axis of the turnbuckle-style support strut to allow for a turnbuckle-style connection in which the threaded housing and the threaded plunger are coupled to the end fittings;
the end fittings have the opposite threads to match the threaded housing and the threaded plunger, such that the end fittings are drawn in or extended out by rotation of the threaded housing and the threaded plunger;
the threaded housing is screwed down on the rotation locking cap and seated against the jam nut, and the threaded plunger has an interface with the rotation locking cap, such that the threaded housing and threaded plunger cannot rotate relative to each other;
the turnbuckle-style support strut uses opposing stacks comprised of one or more Belleville spring washers that are coned-disc springs;
the Belleville spring washers are assembled within the rotation locking cap and the threaded housing and mounted along an axis of the threaded plunger within the threaded housing;
the opposing stacks of the Belleville spring washers are separated by a flange on the threaded plunger extending radially from the threaded plunger, with the opposing stacks of the Belleville spring washers on opposite sides of the flange within the threaded housing;
a spring resistance force is provided by movement of the flange resulting in compression or de-compression of the opposing stacks of the Belleville spring washers on opposite sides of the flange; and
the opposing stacks of the Belleville spring washers separated by the flange on the threaded plunger determine a tunable stiffness of the turnbuckle-style support strut based on a configuration of the opposing stacks of the Belleville spring washers.

16. The method of claim 15, wherein the Belleville spring washers are preloaded to support an axial travel range while ensuring that the Belleville spring washers remain under load to prevent chatter.

17. The method of claim 16, wherein the axial travel range is tailorable, based on a length of the turnbuckle-style support strut and a configuration of the Belleville spring washers.

18. The method of claim 15, wherein the configuration of the opposing stacks of the Belleville spring washers comprises a number of the Belleville spring washers in the opposing stacks of the Belleville spring washers, dimensions of the Belleville spring washers, and/or material composition of the Belleville spring washers.

19. The method of claim 16, wherein the Belleville spring washers are preloaded by torqueing the threaded housing onto the rotation locking cap to compress the Belleville spring washers.

20. The method of claim 19, wherein the jam nut prevents the threaded housing from backing off the rotation locking cap to decompress the Belleville spring washers.

\* \* \* \* \*